US012781885B1

(12) United States Patent
Fosness et al.

(10) Patent No.: US 12,781,885 B1
(45) Date of Patent: Nov. 3, 2026

(54) VEHICLE COOLANT SYSTEM ADAPTER ASSEMBLY

(71) Applicant: CVF Motorsports, Inc., New Prague, MN (US)

(72) Inventors: Shawn Eric Fosness, Hastings, MN (US); Erik Mark Paddock, Andover, MN (US)

(73) Assignee: CVF Motorsports, Inc., New Prague, MN (US)

( * ) Notice: Subject to any disclaimer, the term of this patent is extended or adjusted under 35 U.S.C. 154(b) by 0 days.

(21) Appl. No.: 18/896,539

(22) Filed: Sep. 25, 2024

Related U.S. Application Data

(60) Provisional application No. 63/586,552, filed on Sep. 29, 2023.

(51) Int. Cl.
*F16L 21/00* (2006.01)
*F28F 9/02* (2006.01)

(52) U.S. Cl.
CPC ........... *F16L 21/002* (2013.01); *F28F 9/0256* (2013.01)

(58) Field of Classification Search
CPC ......... F16L 21/002; F16L 55/00; F16L 23/04; F16L 23/08; F16L 25/06; F16L 15/006; F16L 15/007; F16L 15/008; F16L 21/04; F28F 9/0256
See application file for complete search history.

(56) References Cited

U.S. PATENT DOCUMENTS 1,707,087 A * 3/1929 Little .................... F16L 15/001 285/357
5,104,150 A * 4/1992 Bard ........................ F16L 41/02 285/133.11
9,939,093 B2 4/2018 Gitthens
2009/0008929 A1* 1/2009 Person .................. F16L 21/002 285/336
2013/0049358 A1* 2/2013 Wolff .................. F16L 33/2071 285/275
2017/0198846 A1* 7/2017 Gitthens ............... F16L 19/062
2018/0106407 A1* 4/2018 Bahahlul ................. F16L 15/08
2019/0271419 A1* 9/2019 Anton ...................... F16L 19/05

FOREIGN PATENT DOCUMENTS

DE 2317296 A1 * 10/1974
DE 4231084 A1 * 3/1994
DE 202012009241 U1 * 4/2013 ............ E02F 3/3654
GB 2276688 A * 10/1994 .............. F16L 21/08

OTHER PUBLICATIONS

Yamamoto Tsutomu, Yamamoto Tsutomu, 2001-05-18.*
Auto Plumb "−16AN Water-Neck Adapters, No Welding—No Clamps Required" Downloaded: https://autoplumb.com/collections/20an-cooling-system-conversion-parts/products/16an-water-neck-adapters, Available Before Sep. 29, 2023, pp. 6.

* cited by examiner

*Primary Examiner* — Matthew Troutman
*Assistant Examiner* — James A Linford
(74) *Attorney, Agent, or Firm* — Fredrikson & Byron, P.A.

(57) ABSTRACT

An adapter assembly including a base, an adapter, and a seal. The base is configured to fit around a neck of an automotive coolant system. The adapter includes a first end removably connected to the base and a second end opposite the first end. the second end being configured to connect to a hose. The clamp is removably fastened to the base at the neck of the automotive coolant system. A seal is disposed within the base and between the neck and the adapter. The removable connection of the adapter to the base applies a longitudinal force on the seal.

20 Claims, 10 Drawing Sheets

VEHICLE COOLANT SYSTEM ADAPTER ASSEMBLY

RELATED APPLICATIONS

This disclosure claims priority to U.S. provisional patent application 63/586,552, filed on Sep. 29, 2023, the entire contents of which are hereby incorporated herein by reference.

FIELD

The various embodiments herein relate to automotive coolant system accessories.

BACKGROUND

Cooling systems can be used to control and/or regulate the temperature of engines of vehicles. Vehicle coolant systems can include various components used to transport fluid therethrough. Automotive coolant systems can include components such as radiators and water pumps. These components can transport fluid intended to travel to the engine of a vehicle to cool the engine. Radiators and water pumps can include various structures accommodating the transportation of fluid, such as necks with inlet and/or outlet openings. These inlet/outlet openings can be configured to attach to hoses, through which cooling fluid flows. The connection between a hose and an inlet/outlet can be achieved by fitting the hose over the neck of the automotive coolant system component and clamping it. The neck can include a lip extending around the circumference of the inlet/outlet, which can enhance clamping.

SUMMARY

In general, this disclosure relates to automotive coolant system adapter assemblies. The automotive coolant system adapter assembly can be configured to be attached to a radiator and/or water pump in a coolant system of a vehicle. The automotive coolant system adapter assembly can include a base, a seal, an adapter, and a clamp. The adapter assembly can be threadably connected to a hose configured to be connected to the inlet and/or outlet of automotive coolant system component.

Assemblies described herein can provide a variety of advantages. Some assemblies improve the aesthetic appearance of the vehicle coolant system and provide an improved seal between the hose and the inlet/outlet of the automotive coolant system component. The threaded connection of the assembly can enable the adapter to apply a longitudinal force to the inlet/outlet of the automotive coolant system component. The application of the longitudinal force can create a tighter seal between the adapter and the inlet/outlet, thereby reducing the risk of leakage and loss of cooling fluid in the vehicle coolant system.

In one embodiment, an adapter assembly includes a base, an adapter, a clamp, and a seal. The base is configured to fit around a neck of an automotive coolant system. The adapter includes a first end removably connected to the base and a second end opposite the first end. The second end is configured to connect to a hose. The clamp is removably fastened to the base at the neck of the automotive coolant system. The seal is disposed within the base and between the neck and the adapter. The removable connection of the adapter to the base applies a longitudinal force on the seal.

In a further embodiment of the assembly, the clamp includes a first clamp arm having a first fastener opening configured to receive a mechanical fastener and a second clamp arm having a second fastener opening configured to receive the mechanical fastener. When the mechanical fastener is received in the first fastener opening and the second fastener opening, the first clamp arm is fastened to the second clamp arm, thereby fastening the clamp to the base. In a further embodiment of the assembly, each of the first clamp arm and the second clamp arm has a width of about 0.25 inches to about 1.5 inches and a thickness of about 0.25 inches to about 2 inches.

In a further embodiment of the assembly, the base includes a raised portion and the clamp includes a channel that is configured to receive the raised portion of the base. In a further embodiment of the assembly, the base includes a depressed portion. The channel is formed by a first wall, a second wall opposite the first wall, and a channel base extending therebetween. The second wall has a length that is shorter than that of the first wall, and the second wall is configured to receive the depressed portion of the base. In a further embodiment of the assembly, the channel has a width of about 0.125 inches to about 1 inch and a depth of about 0.05 inches to about 1 inch.

In a further embodiment of the assembly, the first end of the adapter includes a first threaded portion and the second end of the adapter includes a second threaded portion. The first threaded portion is threadably connected to the base and the second threaded portion is threadably connectable to the hose.

In a further embodiment of the assembly, the assembly includes the hose. The hose includes a hose line and a hose fitting that is removably connected to the adapter. In a further embodiment of the assembly, the hose fitting includes a longitudinal body configured to provide a straight pathway for fluid between the adapter and the hose line. In a further embodiment of the assembly, the hose fitting includes a curved body configured to provide a curved pathway for fluid between the adapter and the hose line. In a further embodiment of the assembly, the curved body is configured to orient the hose line perpendicularly to the adapter.

In a further embodiment of the assembly, the first end of the adapter includes a first end diameter ranging from about 1 inch to about 3 inches and the second end of the adapter includes a second end diameter ranging from about 1.25 inches to about 1.5 inches, the second end diameter being different from the first end diameter.

In a further embodiment of the assembly, the base and the adapter each comprise a hex portion configured to facilitate the threadable connection of the adapter to the base.

One embodiment includes a method comprising providing an adapter assembly that includes a base, an adapter, a clamp, and a seal. The method includes clamping the base of the adapter assembly to a neck of an automotive coolant system using the clamp. The method includes positioning the seal within the base and between the neck and the adapter of the adapter assembly. The method includes fastening the adapter to the base, thereby applying a longitudinal force to the seal to press the seal between the adapter and the neck to prevent fluid from leaking while flowing between the adapter assembly and the neck.

In a further embodiment of the method, fastening the adapter to the base includes threadably connecting the adapter to the base. In a further embodiment of the method, fastening the adapter to the base comprises increasing the longitudinal force applied on the seal by the adapter.

In a further embodiment of the method, the clamp comprises a first clamp arm and a second clamp arm, each of the first clamp arm and the second clamp arm including a channel. The base includes a raised portion. Clamping the base to the neck includes aligning the channel of the first clamp arm and the channel of the second clamp arm with the raised portion of the base, and fastening the first clamp arm and the second clamp arm together to apply a radially inward force to the neck.

In another embodiment of the method, the method includes providing an adapter assembly that includes a base, an adapter, a clamp, and a seal. The method includes clamping the base to a neck of an automotive coolant system with the clamp, wherein the clamp applies a radially inward force to the neck and limits longitudinal movement of the base. The method includes connecting the adapter to the base to press the seal longitudinally into sealing contact with the base and the neck to prevent fluid from leaking while flowing between the adapter assembly and the neck.

In a further embodiment of the method, the base is movable relative to the neck while clamped to the neck before the adapter is connected to the base but immovable relative to the neck when the adapter has been connected to the base.

In a further embodiment of the method, the base includes internal threads. The adapter has external threads. Connecting the adapter to the base includes threadably connecting the adapter to the base via the internal threads and the external threads.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

The following drawings are illustrative of particular examples of the present disclosure and therefore do not limit the scope of the invention. The drawings are not necessarily to scale, though examples can include the scale illustrated, and are intended for use in conjunction with the explanations in the following detailed description wherein like reference characters denote like elements. Examples of the present disclosure will hereinafter be described in conjunction with the appended drawings.

DETAILED DESCRIPTION

Figure 1A:
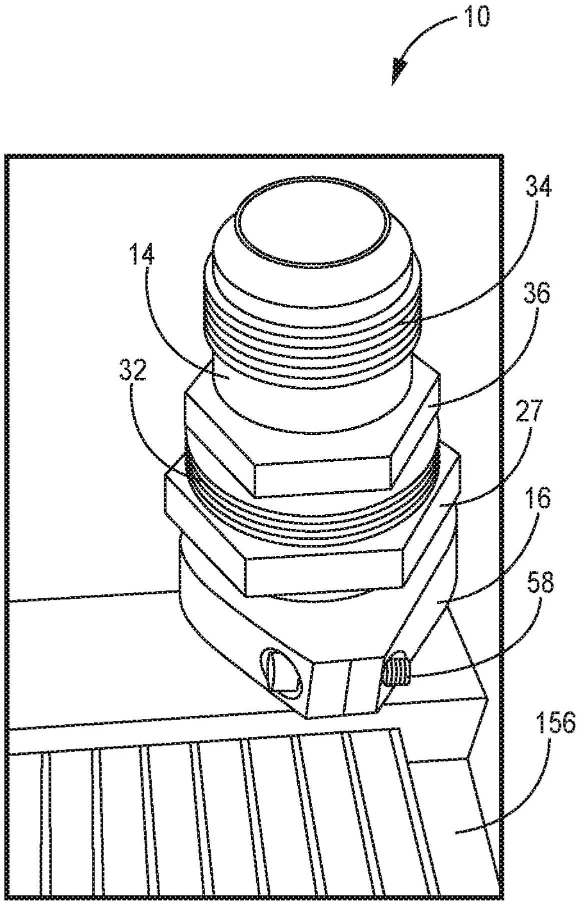
FIGS. 1A-1B are perspective and side views, respectively, of an adapter assembly attached to a radiator inlet/outlet, in accordance with one or more examples of this disclosure.
Figure 1B:
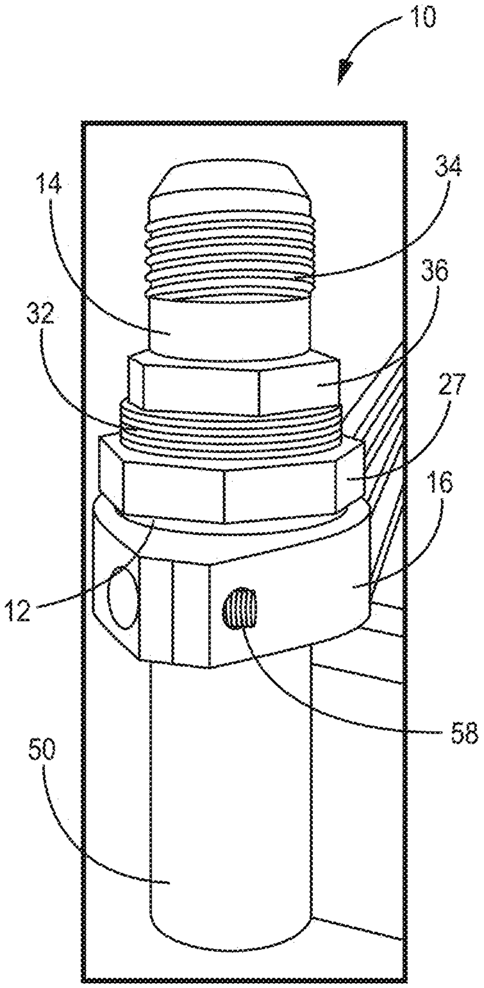

The description herein is directed to an adapter assembly for use with automotive coolant system components, such as radiators or water pumps, as shown in FIGS. 1A-1B. While the embodiments herein are described with respect to automotive coolant system components, the embodiments herein may be used in other vehicles, including, but not limited to, marine vehicles, agricultural vehicles, and/or industrial vehicles.

The adapter assembly described herein can include a variety of features. For example, the adapter assembly 10 can include a base 12, an adapter 14 insertable into the base 12, and a clamp 16. The clamp 16 can be configured to attach the base 12 to the neck 50 of an automotive coolant system component 156, such as radiator 156, as depicted in FIG. 1A. The neck 50 can include an inlet and/or outlet.

Figure 2:
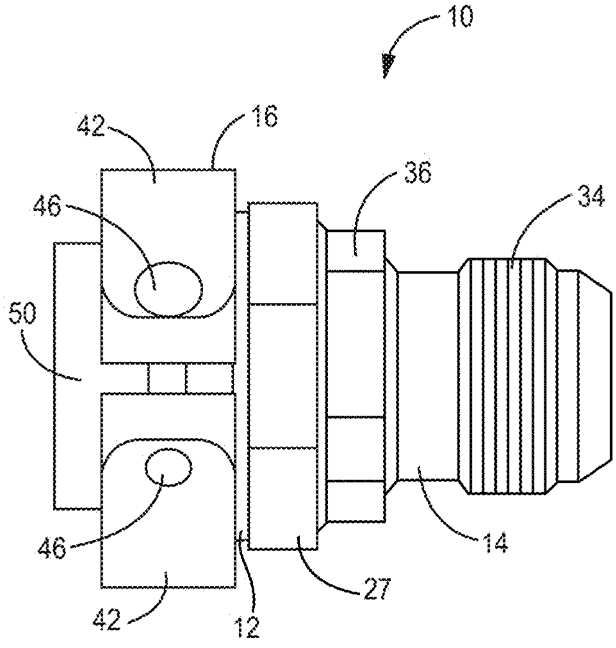
FIG. 2 is a side view of an adapter assembly, in accordance with one or more examples of this disclosure.

FIG. 2 shows the adapter assembly 10 when attached to the neck 50. The clamp 16 can be disposed over the base 12 and the neck 50. In some embodiments, the clamp 16 can fit tightly against the neck 50 and can hold the base 12 loosely, allowing the base 12 to move relative to the neck 50 but not permitting the base 12 to be withdrawn from the clamp 16. The adapter 14 can be threadably inserted into the interior of the base 12 until an edge of the adapter 14 presses a seal 18 against an edge of the neck 50. Base hex portion 27 and adapter hex portion 36 can facilitate this threaded movement. The threaded movement between the adapter 14 and the base 12 can fix the adapter 14 and the base 12 in position relative to the neck 50 and can allow fluid to flow through the neck 50 and the interior of the adapter 14 without leaking at the junction of the neck 50 and the adapter 14. A hose may then be attached to a second threaded portion 34 on an opposite end of the adapter 14 to facilitate transport of coolant through the automotive coolant system. In many embodiments, the second threaded portion 34 is a male threaded connector.

Figure 3A:
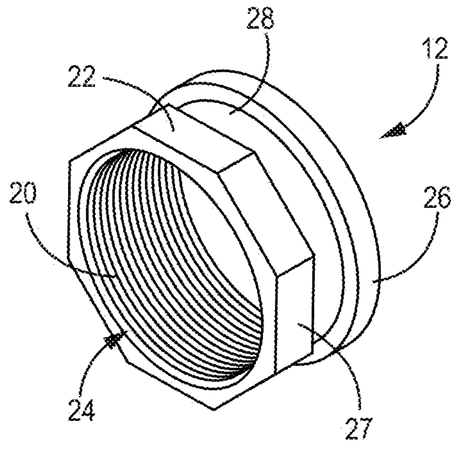
FIG. 3A is a perspective view of a base of an adapter assembly, in accordance with one or more examples of this disclosure.
Figure 3B:
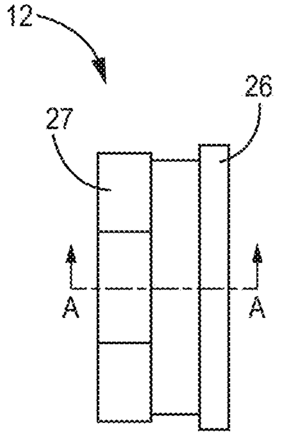
FIG. 3B is a side view of the base of FIG. 3A, in accordance with one or more examples of this disclosure.
Figure 3C:
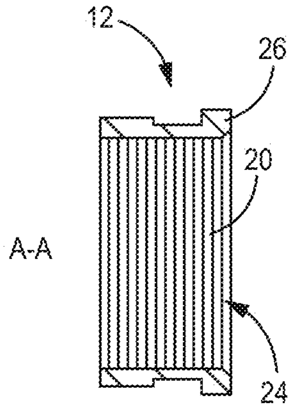
FIG. 3C is a cross-sectional side view of the base of FIGS. 3A-3B, taken along line A-A in FIG. 3B, in accordance with one or more examples of this disclosure.

FIGS. 3A-3C show the base 12. As shown, the base 12 can be a cylindrical, hollow structure and can include an inner surface 20 and an outer surface 22. The outer surface 22 of the base 12 can include a raised portion 26, a base hex portion 27, and a depressed portion 28. In many examples, the depressed portion 28 is between the raised portion 26 and the base hex portion 27. The base hex portion 27 can be configured to be engaged by a tool (e.g., a wrench) to facilitate tightening with the adapter 14 as discussed elsewhere herein. The base 12 can include any structure or feature configured to engage a tool to facilitate tightening of the base 12 with the adapter 14. The inner surface 20 can include a threaded portion 24. In some examples, the threaded portion 24 of the inner surface 20 can be the entirety of the inner surface 20. The inner surface 20 can be a female threaded connector 24 attachable to an adapter 14.

Figure 4A:
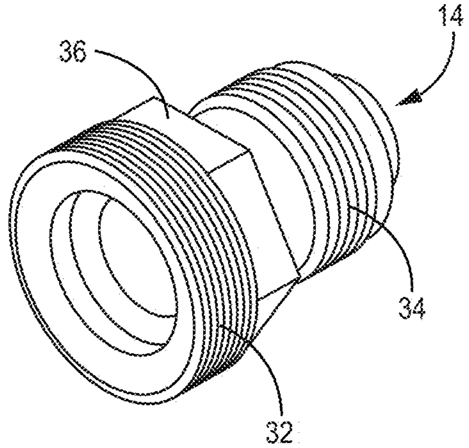
FIG. 4A is a perspective view of an adapter of an adapter assembly, in accordance with one or more examples of this disclosure.
Figure 4B:
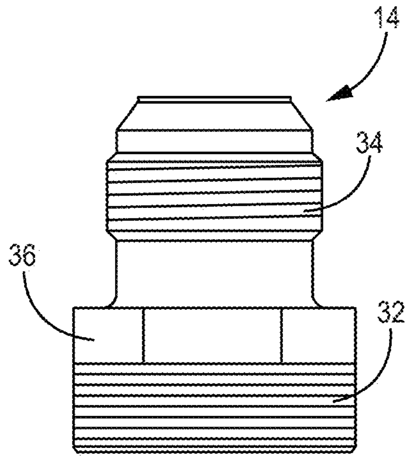
FIG. 4B is a side view of the adapter of FIG. 4A, in accordance with one or more examples of this disclosure.

FIGS. 4A-4B show the adapter 14 of the adapter assembly 10. The adapter 14 can include a first threaded portion 32 and a second threaded portion 34. In some examples, these can be male threaded portions. The first threaded portion 32 can be configured to be mated with the threaded inner surface of the base. The second threaded portion 34 can be configured to fit within a hose or tube. In some examples, a hose can be threadably attached to the second threaded portion 34 of the adapter 14. The second threaded portion 34 can be a male threaded connector configured to mate with a hose's female threaded connector. The adapter 14 can include adapter hex portion 36. The adapter hex portion 36 can be configured to be engaged by a tool (e.g., a wrench) to facilitate tightening with the base as discussed elsewhere herein and/or to facilitate tightening with the hose. The adapter hex portion 36 can be any structure or shape configured to engage with a tool.

The adapter can change in diameter, as shown in FIG. 4B. The portion of the adapter 14 including the second threaded portion 34 can have a smaller diameter than the portion of the adapter 14 including the first threaded portion 32. In some examples, the diameter of the first threaded portion 32 can be about 1 inch to about 3 inches, and the diameter of the second threaded portion 34 can be about 2 AN to about 24 AN. In other examples, the diameter of the first threaded portion 32 can be 1.75 inches inch and the diameter of the second threaded portion 34 can be 16 AN-20 AN (1.25 inches-1.5 inches).

FIG. 5A-5E each show one of two clamp structures 42 that can be combined to form a clamp 16 configured for use in an adapter assembly 10. The clamp structures 42 of the clamp 16 can be fitted around the base 12 of the adapter assembly 10. When the two curved clamp structures 42 are combined in use, the clamp 16 can be generally circular in shape. In other examples, the clamp 16 can be composed of one or more structures, which can take a variety of shapes.

Each clamp structure can include a variety of features. The clamp structure 42 can include an inner recess 44 on an inner surface 48. In use, the inner surface 48 can be adjacent the neck and base. The inner recess 44 can be configured to house various structures of the base such as the raised portion. The clamp 16 can include two fastener channels 46A, 46B adjacent the inner recess 44. The two fastener channels 46A, 46B of a clamp structure 42 can be disposed adjacent the two fastener channels of a second clamp structure 42 when the clamp is in use. This allows the insertion of a fastener through each fastener channel 46 of each clamp structure 42, thereby attaching the adjacent clamp structures 42 to one another.

The attachment of the clamp structures 42 to one another, thereby forming the clamp 16, creates a radial force on the neck of the automotive coolant system component. As discussed elsewhere herein, when the clamp 16 is clamped to the neck and engages the base, the clamp 16 limits movement of the base 12 relative to the neck 50. This can position the base 12 for insertion of the seal 18 therein and engagement of the base 12 with the adapter 14.

Figure 5A:
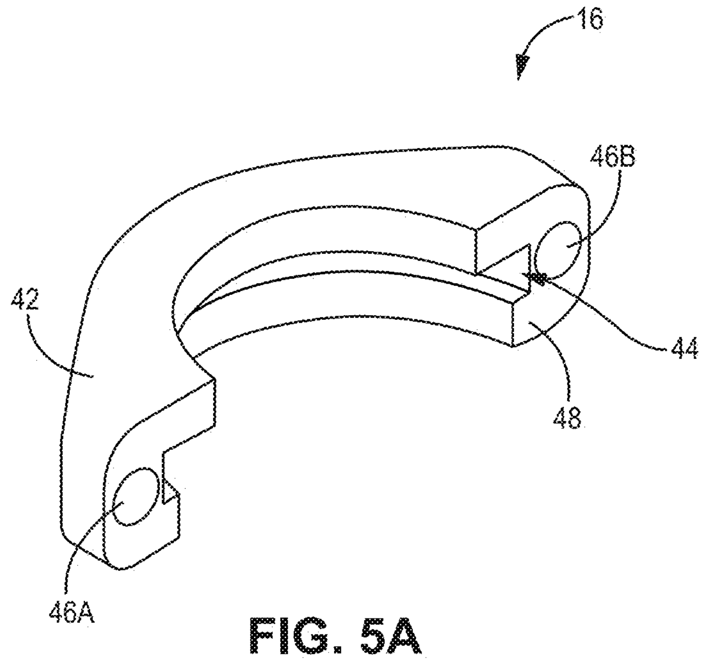
FIG. 5A is a perspective view of a clamp of an adapter assembly, in accordance with one or more examples of this disclosure.
Figure 5B:
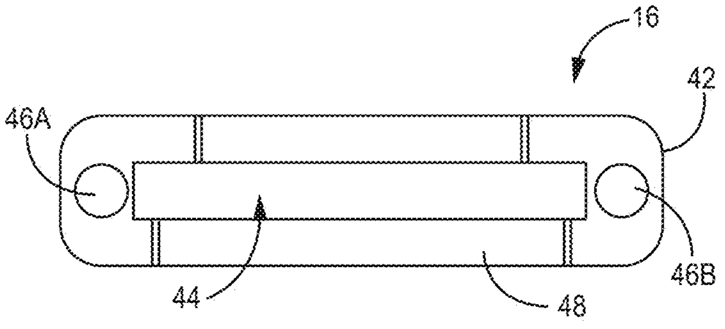
FIG. 5B is a bottom view of the clamp of FIG. 5A, in accordance with one or more examples of this disclosure.

FIG. 5B shows the features of the inner surface 48 of a clamp structure 42, including the disposition of the fastener channels 46A, 46B adjacent the inner recess 44. In some examples, the clamp structure 42 can have a width of about 0.25 inches to about 1.5 inches and a thickness of about 0.25 inches to about 2 inches. In other examples, the width can be 0.75 inches and the thickness can be 0.5 inches. The inner recess can have a width of about 0.125 inches to about 1 inch and a depth of about 0.05 inches to about 1 inch. In other examples, the inner recess can have a width of 0.25 inches and a depth of 0.1 inches. The fastener channels 46A, 46B can have a diameter of about 0.1 inches to about 1 inch. In other examples, the fastener channels 46A, 46B can have a diameter of 0.14 inches. Example fasteners include screws (shown in FIGS. 1A-1B as 58).

Figure 5C:
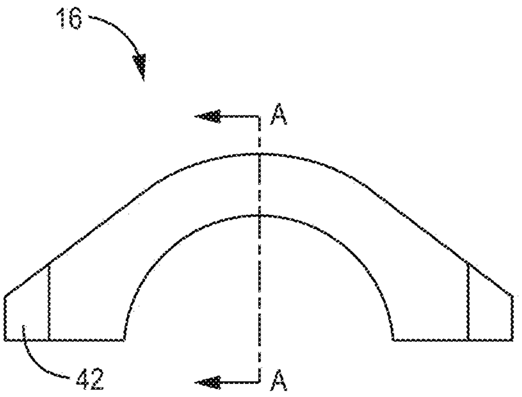
FIG. 5C is a side view of the clamp of FIGS. 5A-B, in accordance with one or more examples of this disclosure.

FIG. 5C shows a side view of a clamp structure 42. The clamp structure 42 can be generally semi-circular in shape, though many structures and shapes may be used for the clamp. In some examples, the sides of the clamp structure 42 can be wider than the portion of the clamp structure 42 between the two sides. The clamp structure 42 can be configured to be fitted around a circular structure such as a neck. The clamp structure 42 can follow a semicircular arc of any diameter configured for use with a neck.

Figure 5D:
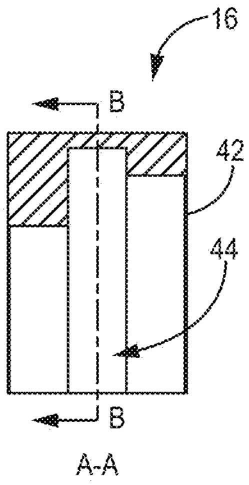
FIG. 5D is a cross-sectional side view of the clamp of FIGS. 5A-5C, taken along line A-A in FIG. 50, in accordance with one or more examples of this disclosure.
Figure 5E:
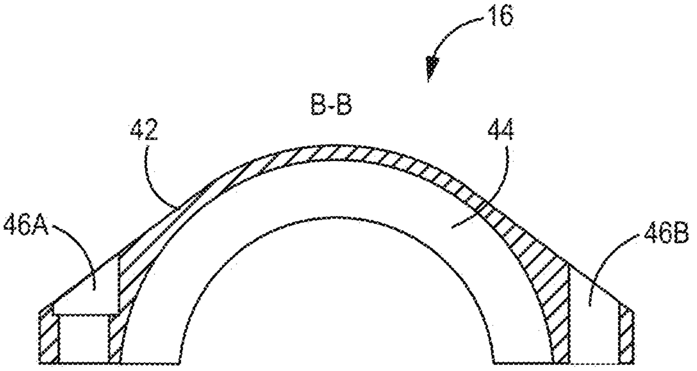
FIG. 5E is a cross-sectional side view of the clamp of FIGS. 5A-5D, taken along line B-B in FIG. 5D, in accordance with one or more examples of this disclosure.

FIG. 5D shows a side cross-sectional view of a clamp structure 42. The inner recess 44 can follow the curved shape of the clamp structure 42 (and/or the curved shape of the neck). The inner recess 44 can be positioned at any location configured to accommodate the raised portion of the base. FIG. 5E shows a side-cross sectional view of a clamp structure 42 including the inner recess 44 and fastener channels 46A, 46B.

Figure 6A:
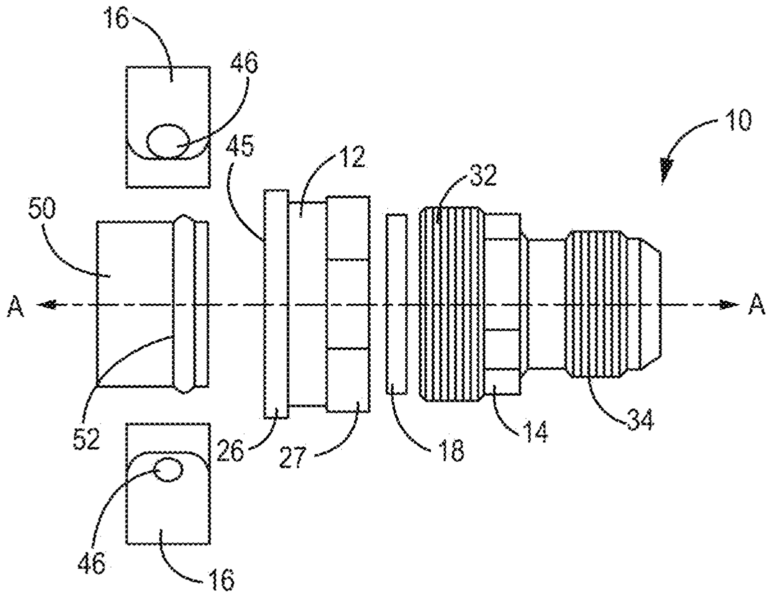
FIG. 6A is an exploded side view of an adapter assembly, in accordance with one or more examples of this disclosure.
Figure 6B:
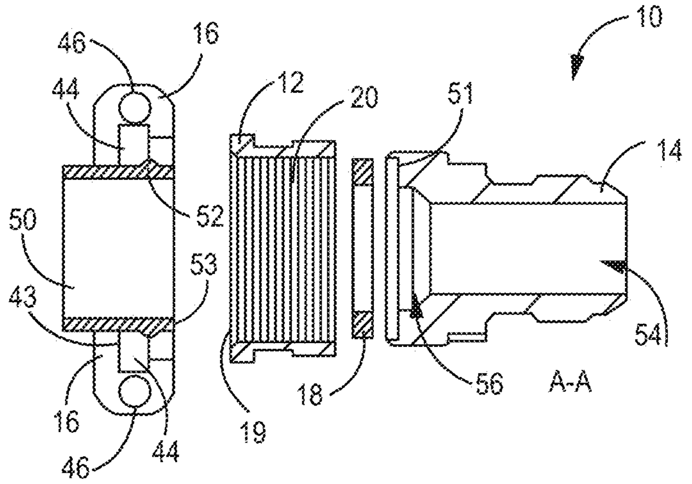
FIG. 6B is an exploded cross-sectional view of the adapter assembly of FIG. 6A, taken along line A-A in FIG. 3A, in accordance with one or more examples of this disclosure.

FIGS. 6A-6B show the interaction between the neck 50 and the adapter assembly 10. The base 12 of the adapter assembly 10 can be disposed over the neck 50. The neck 50 can include a lip 52, which can be covered by the clamp 16 and the base 12 when the clamp 16 is fitted over the base 12 and neck 50. The raised portion 26 of the base 12 can be captured by the inner recess 44 of the clamp 16, and the clamp 16 can be tightened onto the neck 50. In some examples, the raised portion 26 can fit loosely within the inner recess 44 such that the base 12 is able to move to a limited degree relative to the neck 50. In some examples, the raised portion 26 can fit tightly within the inner recess 44 such that the base 12 is prevented from moving relative to the neck 50 when the clamp 16 is tightened.

The adapter 14 can be inserted into the base 12. The first threaded portion 32 of the adapter 14 can be a male threaded connector configured to be threadably insertable into the base 12. The first threaded portion 32 of the adapter 14 can threadably engage inner surface 20 of the base.

When the adapter 14 is tightened and fully engaged with the base 12, the threadable attachment of the base 12 can determine a position of the base 12. When the adapter 14 is tightened, a seat 51 of the adapter 14 presses the seal 18 into the neck 50 of an automotive radiator assembly, thereby limiting how far the adapter 14 can threadably engage with the base 12. Such a limitation can modify the position of the base 12 within the clamp 16. In some examples, such as that of FIG. 6B, the engagement of the adapter 14 with the base 12 can pull the base 12 rightwardly as shown when the adapter 14 is tightened. The left surface 19 of the base 12 may not contact the left-most channel wall 43 (as depicted in FIG. 6B) when the base 12 engages the adapter 14. The left surface 19 of the base 12 may interface with other surfaces of the inner recess 44.

The adapter assembly 10 can include a seal 18. The seal 18 can be made of a liquid impermeable material (e.g., SBR Rubber, medium hard with a hardness Durometer 60A). The seal 18 can have a thickness ranging from about 0.125 inches to about 0.375 inches. In some examples, the thickness of the seal 18 can be 0.125 inches. The seal 18 can be ring-shaped so as to permit coolant to flow through the center hole.

When the adapter assembly 10 is assembled, the seal 18 can be seated in the seat 51 of the adapter 14. As the adapter 14 is threadably inserted into the base 12, the seal 18 moves in a longitudinal direction toward an outer edge 53 of the neck 50. That movement continues until the seal 18 is pressed longitudinally between the seat 51 and the outer edge 53. The threaded connection between the adapter 14 and the base 12 maintains the longitudinal force that presses the seal 18 between the seat 51 and the outer edge 53. The longitudinal force applied to the seal can reduce the leakage of liquid passing through the adapter assembly 10 (e.g., coolant). The base 12, while previously in a loose fit within the clamp 16, then becomes fixed relative to the clamp 16, the neck 50, and the adapter 14. The tight fit between the adapter 14 and the neck 50, along with the tight fit between the clamp 16 and the neck 50, maintains the base 12 in a fixed position relative to the clamp 16, the neck 50, and the adapter 14. A hose can be threadedly added to the second threaded portion 34. While the embodiments herein relate generally to an adapter assembly including threadable components; the various components of the adapter assembly may include any means of attaching the base, seal, and adapter assembly to one another as described herein such that a longitudinal force is applied by the adapter to the seal and mitigating the leakage of fluid passing therethrough.

Figure 7A:
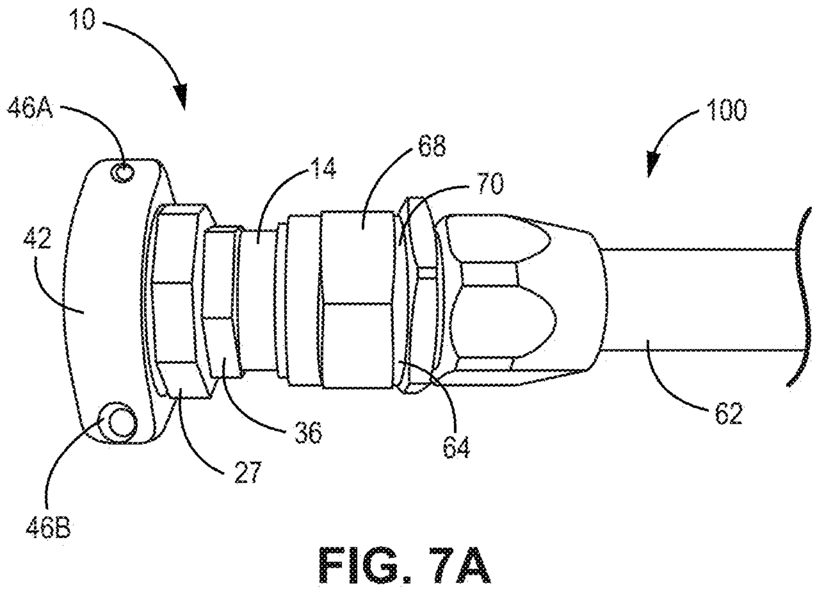
FIG. 7A is a perspective view of a straight hose fitting attached to an adapter assembly, in accordance with one or more examples of this disclosure.
Figure 7B:
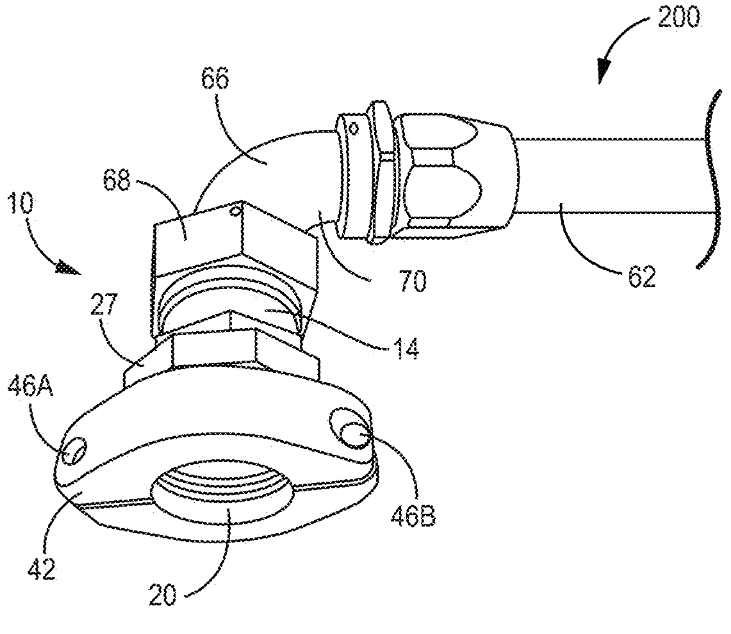
FIG. 7B is a perspective view of an angled hose fitting attached to an adapter assembly, in accordance with one or more examples of this disclosure.

FIG. 7A and FIG. 7B each show examples of hose fittings 70 for use with an adapter assembly 10. FIG. 7A shows an embodiment 100 of a hose fitting having a longitudinal body 64. The longitudinal body 64 can be configured to provide a straight pathway for fluid between the adapter 14 and the hose line 62. The longitudinal body 64 may be generally short in length relative the hose line 62 and adapter assembly 10.

The hose fitting 70 can include a hex portion 68 and a longitudinal body 64. The longitudinal body 64 can be generally straight and comprise a hose fitting 70 or other structure configured to connect to a hose line 62. The body 64 can form a generally cylindrical fluid passage, allowing a fluid to pass therethrough. Some embodiments of the hose fitting 70 can have a length of about 0.5 inches to about 3 inches. In other embodiments, the hose fitting can have a length of about 1.25 inches. The length of the hose fitting 70 may vary depending on the coolant system with which it is used.

The hex portion 68 of the hose fitting can be configured to be attached to the adapter 14 of the adapter assembly. In some embodiments, the hex portion 68 can be include an interior surface (not pictured). In some embodiments, the interior surface may be threaded. The threaded interior surface can threadably engage with the second threaded portion 34 of the adapter 14, thereby connecting the hose line 62 to the adapter 14.

In other embodiments, such as that of FIG. 7B, the hose fitting 70 can include a curved body 66 configured to provide a curved pathway for fluid between the adapter 14 and the hose line 62. The curved body 66 can be configured to orient the hose line 62 perpendicularly to the adapter 14. In other embodiments, curved body 66 can be configured to direct the hose line 62 in any direction and at any angle. For example, the curved body 66 can orient the hose line 62 at 15, 30, 45, 60, 75, 90, or 135 degrees relative the adapter 14.

The hose line 62 direction can depend on the configuration and layout of vehicle components. For example, in some embodiments, the hose line 62 may be disposed between a radiator and water pump. In other embodiments, the hose line 62 may be disposed between a radiator and housing for components regulating engine temperature (e.g., a thermostat). Positioning the hose line 62 in such exemplary embodiments or similar embodiments may require different hose fitting 70 configurations. The hose fitting 70 may be selected to accommodate for the positioning of the hose line 62 between and/or around said various components.

When the adapter assembly 10 is assembled, a channel 54 can be formed from the neck 50 through the base 12 and the adapter 14. In some examples, the channel 54 can have a greater diameter in the neck 50 than in the adapter 14. The adapter 14 can include a tapered channel portion 56 at which the channel 54 changes diameter. In some embodiments, the narrow portion of the channel 54 can range from about 0.125 inches to about 2 inches. In other examples, the narrow portion of the channel can be 0.844 inches. It can be desirable to make the diameter as consistently large as possible to prevent flow restriction while also allowing sufficient material outside the threads. The narrow portion of the channel 54 can be any diameter configured for attachment with a hose.

Figure 8:
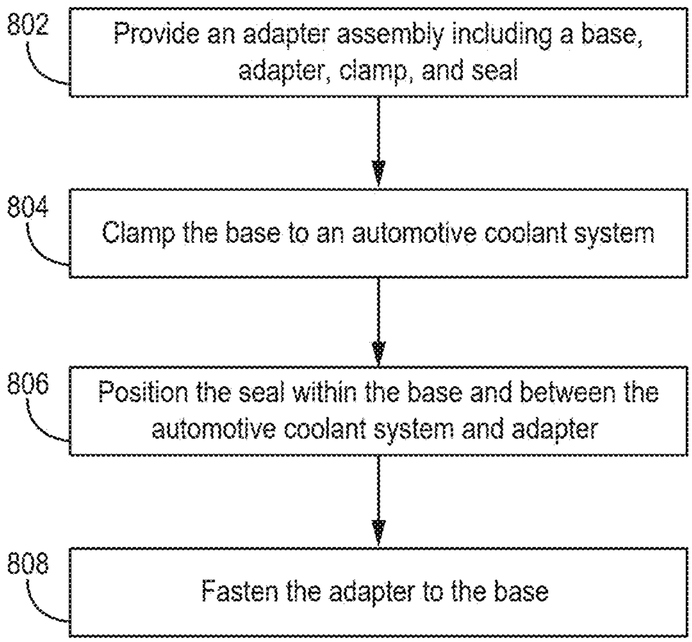
FIG. 8 is a flow diagram of an embodiment of a method for installing an adapter assembly, in accordance with one or more examples of this disclosure.

FIG. 8 shows an embodiment of a method of installing an adapter assembly. The method can include providing an adapter assembly that includes a base, an adapter, a clamp, and a seal (block 802). The method includes clamping the base of the adapter assembly to a neck of an automotive coolant system using the clamp (block 804). The method includes positioning the seal within the base and between the neck and the adapter of the adapter assembly (block 806). The method includes fastening the adapter to the base (block 808). Fastening the adapter to the base can include applying a longitudinal force to the seal to press the seal between the adapter and the neck to prevent fluid from leaking while flowing between the adapter assembly and the neck. The adapter can apply such a longitudinal force to the seal. The method includes connecting the adapter to the base to press the seal longitudinally into sealing contact with the base and the neck to prevent fluid from leaking while flowing between the adapter assembly and the neck.

In some examples, fastening the adapter to the base can include threadably connecting the adapter to the base. In other examples, fastening the adapter to the base can be completed by connecting the base to the adapter in any means that applies a longitudinal force on the seal between the adapter and the neck. For example, the adapter may be configured to lock into the base and/or may be fastened to the base using a separate mechanical fastener. Some examples of the method include fastening the adapter to the base such that longitudinal force applied on the seal by the adapter increases. The increased longitudinal force on the seal can prevent leakage of a liquid at the junction between the seal, adapter, and neck, which can improve performance of the vehicle coolant system.

The methods described herein can incorporate the clamp. The method can include clamping the base to a neck of an automotive coolant system with the clamp. As described elsewhere herein, the clamp can include a first clamp arm and a second clamp arm, each having a channel. The base can include a raised portion. In some embodiments of the method, clamping the base to the neck can include aligning the channel of the first clamp arm and the channel of the second clamp arm with the raised portion of the base. The method can include fastening the first clamp arm and the second clamp arm together to apply a radially inward force to the neck. The first and second clamp arms can be fastened together while the channel is aligned with the raised portion of the base.

This can secure the base relative to the clamp while allowing the base to move relative to the neck, as described elsewhere herein. The clamp can apply a radially inward force to the neck and can limit longitudinal movement of the base. In some embodiments of the method, the base can be movable relative to the neck while clamped to the neck before the adapter is connected to the base but immovable relative to the neck when the adapter has been connected to the base. As discussed with respect to FIG. 3A-FIG. 4B, the base can include internal threads, and the adapter includes external threads. Connecting the adapter to the base can include threadably connecting the adapter to the base via the internal threads and the external threads. This connection can limit movement of the base relative to the neck once the adapter is connected.

While the various systems described above are separate implementations, any of the individual components, mechanisms, or devices, and related features and functionality, within the various system embodiments described in detail above can be incorporated into any of the other system embodiments herein.

What is claimed is:

1. An adapter assembly, comprising:

(a) a base configured to fit around a neck of an automotive coolant system;

(b) an adapter, comprising:

(i) a first end removably connected to the base; and (ii) a second end opposite the first end, the second end being configured to connect to a hose;

(c) a clamp removably fastened to the base at the neck of the automotive coolant system; and (d) a seal disposed within the base and between a terminal edge of the neck and the adapter, wherein the removable connection of the adapter to the base applies a longitudinal force on the seal.

2. The adapter assembly of claim 1, wherein the clamp comprises:

(a) a first clamp arm having a first fastener opening configured to receive a mechanical fastener; and (b) a second clamp arm having a second fastener opening configured to receive the mechanical fastener, wherein, when the mechanical fastener is received in the first fastener opening and the second fastener opening, the first clamp arm is fastened to the second clamp arm, thereby fastening the clamp to the base.

3. The adapter assembly of claim 2, wherein each of the first clamp arm and the second clamp arm comprises a width of about 0.25 inches to about 1.5 inches and a thickness of about 0.25 inches to about 2 inches.

4. The adapter assembly of claim 1, wherein the base comprises a raised portion and the clamp comprises a channel that is configured to receive the raised portion of the base.

5. The adapter assembly of claim 4, wherein the base further comprises a depressed portion, and wherein the channel is formed by a first wall, a second wall opposite the first wall, and a channel base extending therebetween, the second wall having a length that is shorter than that of the first wall, and the second wall being configured to receive the depressed portion of the base.

6. The adapter assembly of claim 4, wherein the channel comprises a width of about 0.125 inches to about 1 inch and a depth of about 0.05 inches to about 1 inch.

7. The adapter assembly of claim 1, wherein the first end of the adapter comprises a first threaded portion and the second end of the adapter comprises a second threaded portion, and wherein the first threaded portion is threadably connected to the base and the second threaded portion is threadably connectable to the hose.

8. The adapter assembly of claim 1, further comprising the hose, the hose including a hose line and a hose fitting that is removably connected to the adapter.

9. The adapter assembly of claim 8, wherein the hose fitting comprises a longitudinal body configured to provide a straight pathway for fluid between the adapter and the hose line.

10. The adapter assembly of claim 8, wherein the hose fitting comprises a curved body configured to provide a curved pathway for fluid between the adapter and the hose line.

11. The adapter assembly of claim 10, wherein the curved body is configured to orient the hose line perpendicularly to the adapter.

12. The adapter assembly of claim 1, wherein the first end of the adapter comprises a first end diameter ranging from about 1 inch to about 3 inches and the second end of the adapter comprises a second end diameter ranging from about 1.25 inches to about 1.5 inches, the second end diameter being different from the first end diameter.

13. The adapter assembly of claim 1, wherein the base and the adapter each comprise a hex portion configured to facilitate the threadable connection of the adapter to the base.

14. A method comprising:

(a) providing an adapter assembly that includes a base, an adapter, a clamp, and a seal;

(b) clamping the base of the adapter assembly to a neck of an automotive coolant system using the clamp;

(c) positioning the seal within the base and between a terminal edge of the neck and the adapter of the adapter assembly; and (d) fastening the adapter to the base, thereby applying a longitudinal force to the seal to press the seal between the adapter and the terminal edge of the neck to prevent fluid from leaking while flowing between the adapter assembly and the neck.

15. The method of claim 14, wherein fastening the adapter to the base comprises threadably connecting the adapter to the base.

16. The method of claim 14, wherein fastening the adapter to the base comprises increasing the longitudinal force applied on the seal by the adapter.

17. The method of claim 14, wherein:

the clamp comprises a first clamp arm and a second clamp arm, each of the first clamp arm and the second clamp arm including a channel, the base comprises a raised portion, and clamping the base to the neck comprises aligning the channel of the first clamp arm and the channel of the second clamp arm with the raised portion of the base, and fastening the first clamp arm and the second clamp arm together to apply a radially inward force to the neck.

18. A method comprising:

(a) providing an adapter assembly that includes a base, an adapter, a clamp, and a seal;

(b) clamping the base to a neck of an automotive coolant system with the clamp, wherein the clamp applies a radially inward force to the neck and limits longitudinal movement of the base; and (c) connecting the adapter to the base to press the seal longitudinally into sealing contact with the base and a terminal edge of the neck to prevent fluid from leaking while flowing between the adapter assembly and the neck.

19. The method of claim 18, wherein the base is movable relative to the neck while clamped to the neck before the adapter is connected to the base but immovable relative to the neck when the adapter has been connected to the base.

20. The method of claim 18, wherein the base comprises internal threads, and the adapter has external threads, and wherein connecting the adapter to the base comprises threadably connecting the adapter to the base via the internal threads and the external threads.

* * * * *